(12) United States Patent
Choung et al.

(10) Patent No.: US 8,894,952 B1
(45) Date of Patent: Nov. 25, 2014

(54) METHOD OF REDUCING NITROGEN OXIDE USING AMINE COMPOUND AS REDUCTANT

(71) Applicants: Hyundai Motor Company, Seoul (KR); Postech Academy-Industry Foundation, Pohang-si (KR)

(72) Inventors: Jin Woo Choung, Suwon-si (KR); In-Sik Nam, Pohang (KR); Mun-Kyu Kim, Pohang-si (KR); Young Jin Kim, Ulsan (KR); Pyung Soon Kim, Daejeon (KR); Byong-Kwon Cho, Pohang-si (KR)

(73) Assignees: Hyundai Motor Company, Seoul (KR); Postech Academy-Industry Foundation, Pohang-Si (KR)

( * ) Notice: Subject to any disclaimer, the term of this patent is extended or adjusted under 35 U.S.C. 154(b) by 0 days.

(21) Appl. No.: 13/957,079

(22) Filed: Aug. 1, 2013

(51) Int. Cl.
| | | |
|---|---|---|
| *B01D 53/56* | (2006.01) | |
| *B01D 53/94* | (2006.01) | |
| *F01N 3/10* | (2006.01) | |
| *F01N 3/20* | (2006.01) | |

(52) U.S. Cl.
CPC .................................. *B01D 53/9418* (2013.01)
USPC ......... 423/213.2; 423/239.1; 60/274; 60/299; 60/301

(58) Field of Classification Search
CPC .. B01D 53/56; B01D 53/565; B01D 53/8625; B01D 53/8628; B01D 53/9409; B01D 53/9413; B01D 53/9418
USPC .............. 423/213.2, 239.1; 60/274, 299, 301
See application file for complete search history.

(56) References Cited

U.S. PATENT DOCUMENTS

| | | | | |
|---|---|---|---|---|
| 5,609,839 | A * | 3/1997 | Itoh et al. .................... | 423/213.2 |
| 5,980,844 | A * | 11/1999 | Kharas ........................ | 423/213.2 |
| 7,485,271 | B2 * | 2/2009 | Golunski et al. ............ | 423/213.2 |
| 7,541,010 | B2 * | 6/2009 | Park et al. ................... | 423/213.2 |
| 7,803,338 | B2 * | 9/2010 | Socha et al. ................ | 423/239.1 |
| 8,062,617 | B2 * | 11/2011 | Stakhev et al. ............. | 423/213.2 |
| 2013/0294990 | A1 * | 11/2013 | Koch et al. .................. | 423/213.5 |

FOREIGN PATENT DOCUMENTS

JP        2010-506088 A        2/2010

* cited by examiner

*Primary Examiner* — Timothy Vanoy
(74) *Attorney, Agent, or Firm* — Morgan, Lewis & Bockius LLP

(57) ABSTRACT

A method of reducing nitrogen oxide includes a process of injecting a reductant including an amine compound and an exhaust gas including nitrogen oxide into a catalyst system including a silver alumina ($Ag/Al_2O_3$) catalyst.

12 Claims, 9 Drawing Sheets

METHOD OF REDUCING NITROGEN OXIDE USING AMINE COMPOUND AS REDUCTANT

BACKGROUND OF INVENTION

1. Field of Invention

The present invention relates to a method of reducing nitrogen oxide using an amine compound as a reductant.

2. Description of Related Art

Around the globe, development of environmentally-friendly vehicle engines exhausting $CO_2$ in a small amount and having excellent energy efficiency has attracted attention due to global warming and high oil prices. A currently developed diesel engine is a high fuel-efficient engine, and exhausts $CO_2$ in a small amount, and thus research and development thereof have been actively conducted in Europe and Korea.

However, the diesel engine has a problem in that even though the exhaust amount of $CO_2$ is small, nitrogen oxide ($NO_x$) and particulate materials (PM), which are harmful to a human body and the environment, are exhausted. Particularly, since nitrogen oxide is a main cause material of smogs and acid rains and regulation thereof has gradually been reinforced in advanced countries and Korea, nitrogen oxide should be essentially removed through an exhaust gas post-treatment system. As described above, in accordance with gradual reinforcement of regulation of nitrogen oxide, development of an exhaust gas post-treatment technology is further required together with improvement in engine.

In the diesel engine, a temperature of an exhaust gas of a light-duty vehicle is 150° C. to 250° C. and a temperature of a heavy-duty vehicle is about 200° C. to 350° C., and the temperature of the exhaust gas is slightly low (R. G. Gonzales, "Diesel Exhaust Emission System Temperature Test", T&D Report 0851-1816P, SDTDC, U.S. Department of Agriculture, December 2008). Accordingly, the exhaust gas post-treatment technology of the diesel engine requires a catalyst system that can remove nitrogen oxide even at low temperatures.

Currently, in order to overcome tightened regulation of the exhaust gas at home and abroad, a urea selective catalytic reduction (SCR) technology and a NOx adsorber technology (lean NOx trap, LNT) have been developed as a method of efficiently removing nitrogen oxide exhausted from the diesel engine. The urea/SCR technology is a technology of removing nitrogen oxide by using urea as a reductant and zeolite as a catalyst to selectively reduce nitrogen oxide, and is known as a technology having the most excellent performance at low temperatures among currently developed technologies of removing nitrogen oxide. However, the urea/SCR technology has technical inferiorities in that hydrothermal stability is low and a catalyst activity easily deteriorates by $SO_2$ and hydrocarbons included in the exhaust gas, and also has problems in that a urea storage device should be further installed in the vehicle and urea is periodically injected (A. E. El-Sharkawy, P. D. Kalantzis, M. A. Syed and D. J. Snyder, SAE International Journal of Passenger Cars-Mechanical Systems, 2 (2009) 1042).

The adsorber technology (LNT) is a technology of removing $NO_x$ by storing $NO_x$ generated under a condition (lean condition) where oxygen exists in a large amount in the exhaust gas and reducing the stored $NO_x$ under a condition (rich condition) where oxygen exists in a small amount, and has merits in that low temperature and high temperature performances are excellent and an additional infrastructure required in the urea/SCR system is not required. However, there are drawbacks in that since a large amount of noble metal catalyst is used, cost thereof is high, an engine operation is complicated, and the technology is weak to poisoning by sulfur (H. Shinjoh, N. Takahashi, K. Yokoda and N. Sugiura, Appl. Catal. B, 15 (1998) 189).

In a HC/SCR technology developed as an alternative technology of the urea/SCR technology and the LNT technology, nitrogen oxide is removed by using hydrocarbons exhausted from the exhaust gas or diesel used as fuel as the reductant. However, the HC/SCR technology has a drawback in that the low activity is exhibited at low temperatures as compared to the urea/SCR technology.

In order to increase the activity at low temperatures of the HC/SCR, study of using alcohol-based hydrocarbons and oxygenated hydrocarbons as the reductant (K. Shimizu, M. Tsuzuki, A. Satsuma, Appl. Catal. B: Environ., 71 (2007) 80), or simultaneously using diesel fuel and ethanol as the reductant has been conducted (M. K. Kim, P. S. Kim, J. H. Baik, I.-S, Nam, B. K. Cho and S. H. Oh, Appl. Catal. B, 105 (2011) 1). However, low activity is still exhibited at 250° C. or less, and thus there is a need to develop a reductant or a catalyst system exhibiting high nitrogen oxide removing efficiency even at low temperatures in order to apply the technology to a commercial system in practice.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method of reducing nitrogen oxide, which has excellent nitrogen oxide removing efficiency by using an amine compound as a reductant.

Various aspects of the present invention provide for a method of reducing nitrogen oxide, including: a process of injecting a reductant including an amine compound and an exhaust gas including nitrogen oxide into a catalyst system including a silver alumina ($Ag/Al_2O_3$) catalyst.

The amine compound may be selected from the group consisting of monoethanolamine, ethylamine, and a combination thereof.

A mixing ratio (reductant/nitrogen oxide) of the reductant and nitrogen oxide may be 0.5 to 2 in the temperature range of 150° C. to 500° C.

In various aspects of the present invention, the catalyst may have a multi-layered structure including a first catalyst layer and a second catalyst layer, the first catalyst layer may include a first catalyst of silver alumina ($Ag/Al_2O_3$), and the second catalyst layer may include a second catalyst selected from the group consisting of Fe-ZSM5, Cu-ZSM5, MnFe/ZSM5, Cu-SSZ13, and a combination thereof.

In various aspects of the present invention, the catalyst may have a multi-layered structure further including a third catalyst layer in addition to a first catalyst layer and a second catalyst layer, in which the second catalyst layer is positioned between the first catalyst layer and the third catalyst layer. The first catalyst layer may include a first catalyst of silver alumina ($Ag/Al_2O_3$), the second catalyst layer may include a second catalyst of Fe-ZSM5, and the third catalyst layer may include a third catalyst of MnFe/ZSM5.

In the case where the catalyst includes the first catalyst layer, the second catalyst layer, and the third catalyst layer, a volume ratio of the first catalyst, the second catalyst, and the third catalyst may be 0.75:0.25:1 to 1:0.25:1. Further, the reductant may be injected to sequentially pass through the first catalyst layer, the second catalyst layer, and the third catalyst layer.

In the second catalyst of Cu-ZSM5, Cu-SSZ13, or Fe-ZSM5, the amount of Cu or Fe may be 2 wt. % to 4 wt. % based on a total weight of the second catalyst, and in the second catalyst of MnFe/ZSM5, the amount of Mn may be 10 wt. % to 40 wt. % based on the total weight of the second catalyst, and the amount of Fe may be 5 wt. % to 20 wt. % based on the total weight of the second catalyst.

The reductant may further include ethanol, and in this case, the amount of ethanol may be 13 volume % to 26 volume % based on 100 volume % of the entire reductant (i.e. the total amount of the amine compound and ethanol).

The exhaust gas may include 2.5 volume % to 10 volume % of water.

According to various aspects of the present invention, in a method of reducing nitrogen oxide, an ability of efficiently reducing nitrogen oxide to nitrogen at low temperatures, that is, low temperature activity is increased, and nitrogen oxide reduction efficiency is very excellent.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1A:
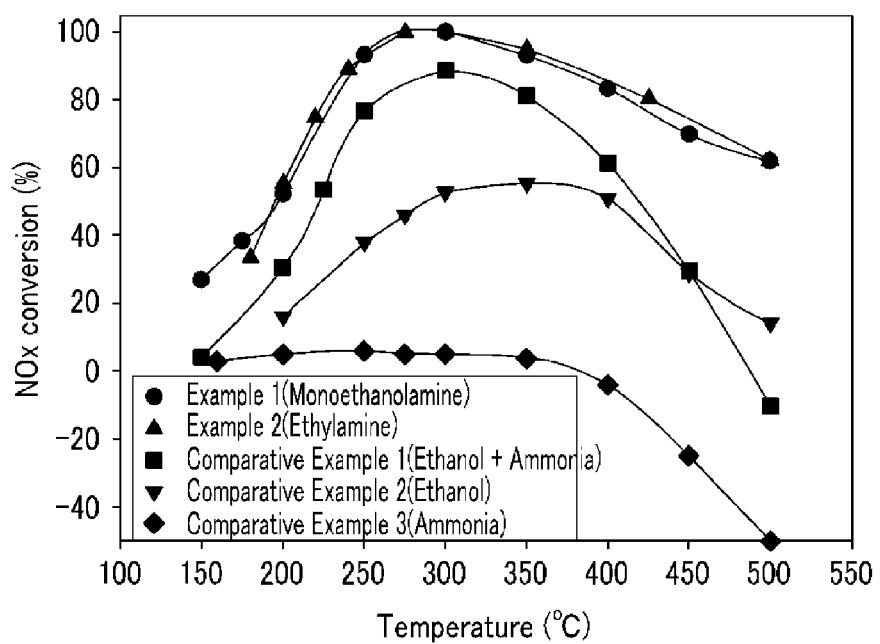
FIG. 1A is a graph illustrating an exemplary measured nitrogen oxide conversion according to processes of Examples 1 and 2 and Comparative Examples 1 to 3.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of the present invention provides a method of reducing nitrogen oxide, including a process of injecting a reductant including an amine compound and an exhaust gas including nitrogen oxide into a catalyst system including a silver alumina ($Ag/Al_2O_3$) catalyst.

The amine compound may be selected from the group consisting of monoethanolamine, ethylamine, and a combination thereof, and monoethanolamine may be preferable In the silver alumina catalyst-based system, in the case where the amine compound is used as the reductant, an excellent reduction activity is exhibited as compared to a reductant in the related art, such as urea or ethanol. The amine compound is a material having all of hydrocarbon and nitrogen components, and has a merit in that the amine compound can easily generate an intermediate reducing nitrogen oxide.

The reason why monoethanolamine may be most preferable among the amine compounds is that nitrogen selectivity ($N_2$ selectivity) is excellent because the intermediate having excellent reactivity, such as isocyanate (—NCO) and oxime (—C(H)=NOH), is easily generated from monoethanolamine. Further, monoethanolamine is decomposed on the catalyst to generate hydrogen, and the hydrogen generated herein may serve to allow a SCR reaction to be rapidly performed on the silver alumina catalyst. In embodiments, it is most preferable that the reductant may be an aqueous solution of monoethanolamine having about 40 volume % to 60 volume %, since it has very low freezing point of about −50° C.

The reductant may further include ethanol. In this case, the amount of ethanol may be 13 volume % to 26 volume % based on the total volume of the reductant (the total volume of the amine compound and ethanol).

A nitrogen oxide removing ratio of the catalyst of the silver alumina catalyst depends on a mixing ratio of the reductant and nitrogen oxide, and it is appropriate that the mixing ratio (reductant/nitrogen oxide) of the reductant and nitrogen oxide be 0.5 to 2 in the temperature range of 150° C. to 500° C. (since the mixing ratio is a ratio according to concentrations of reductant/nitrogen oxide, there is no unit. For example, if the amount of monoethanol amine is 400 ppm and the amount of nitrogen oxide is 400 ppm, the mixing ratio of reductant/nitrogen oxide is 1).

More specifically, in the case where the mixing ratio of reductant/nitrogen oxide is 1 in the temperature range of 150° C. to 350° C. and the mixing ratio of reductant/nitrogen oxide is 2 in the temperature range of more than 350° C. and 500° C. or less, the nitrogen oxide removing ratio is high, which is preferable. Exhibiting the descending order of the nitrogen oxide removing ratio according to the temperature, the nitrogen oxide removing ratio is reduced in the order of 1, 0.5, and 2 of the mixing ratio of reductant/nitrogen oxide in the temperature range of 150° C. to 350° C., and the nitrogen oxide removing ratio is reduced in the order of 2, 1, and 0.5 of the mixing ratio of reductant/nitrogen oxide in the temperature range of more than 350° C. and 500° C. or less.

Resultantly, in the case where the mixing ratio of reductant/nitrogen oxide is 2, an unreacted reductant deactivates an active site at low temperatures (200° C. to 350° C.) to reduce the activity.

In various embodiments of the present invention, the nitrogen oxide removing ratio depends on the concentration of water in a reaction gas, and in the case where water is included in the exhaust gas, the nitrogen oxide removing efficiency becomes more excellent. Therefore, in order to increase the nitrogen oxide removing ratio, optimization of the water concentration is required, and the appropriate amount of water included in the exhaust gas may be 2.5 volume % to 10 volume %. The more appropriate amount of water may be 2.5 volume % to 5 volume %, and in this case, the high nitrogen oxide removing efficiency is exhibited at 350° C. or less, which is more appropriate.

In the silver alumina catalyst, it is appropriate that the amount of silver is 2 wt. % to 6 wt. % and the amount of alumina may be 94 wt. % to 98 wt. % based on the total weight of the silver alumina catalyst. In the case of the silver alumina catalyst, the nitrogen oxide removing ratio according to the reaction temperature depends on the amount of Ag, the nitrogen oxide removing ratio is increased at high temperatures as the amount of Ag is reduced, and the nitrogen oxide removing ratio is increased at low temperatures as the amount of Ag is increased, and thus the catalyst may be composed while changing the amount of Ag within the range of 2 wt. % to 6 wt. % according to an application temperature of the catalyst.

Further, γ-alumina is appropriate as alumina used as a supporter in the silver alumina catalyst. In the case where γ-alumina is used as the supporter, a BET surface area is wide, and thus there may be a merit in that small silver particles are uniformly distributed on a surface of alumina.

In various embodiments of the present invention, the catalyst may have the multi-layered structure including a first catalyst layer and a second catalyst layer, the first catalyst layer may include the first catalyst of silver alumina (Ag/$Al_2O_3$), and the second catalyst layer may include a second catalyst selected from the group consisting of Fe-ZSM5, Cu-ZSM5, MnFe/ZSM5, Cu-SSZ13, and a combination thereof. A volume ratio of the first catalyst and the second catalyst may be 1:1 to 1:2. In the case where the volume ratio of the first catalyst and the second catalyst is included in this range, the more excellent activity may be exhibited. If an amount of the first catalyst is excessive, since ammonia is not removed, the $N_2$ activity is not increased, and if the amount of the second catalyst is increased, since monoethanolamine is not oxidized in the first catalyst, the second catalyst may be poisoned to reduce the activity. As described above, in the case where the catalyst having a double layer structure is used, the superior nitrogen oxide removing activity may be obtained. ZSM5 is a kind of aluminosilicate zeolite and a material known as $Na_nAl_nSi_{96-n}O_{192} \cdot 16H_2O$ (0<n<27), and SSZ13 is a kind of aluminosilicate zeolite and a material known as $RN_aNa_bAl_{2.4}Si_{33.6}O_{72} \cdot wH_2O$ (1.4<a<27, 0.7<b<4.3, 1<w<7, RN: N,N,N-1-trimethyladamantammonium).

In various embodiments of the present invention, the catalyst may have a multi-layered structure further including a third catalyst layer in addition to a first catalyst layer and a second catalyst layer in which the second catalyst layer is positioned between the first catalyst layer and the third catalyst layer. The first catalyst layer may include a first catalyst of silver alumina (Ag/$Al_2O_3$), the second catalyst layer may include a second catalyst of Fe-ZSM5, and the third catalyst layer may include a third catalyst of MnFe/ZSM5. In the case where the catalyst having the triple layer structure is used, since the second catalyst layer has the excellent high temperature activity and the third catalyst layer has the excellent low temperature activity, the nitrogen oxide removing effect may be increased at all temperatures ranging from the low temperature to the high temperature.

That is, in various embodiments of the present invention, the catalyst may have the double layer structure or the triple layer structure. Regardless of whether the catalyst has the double layer structure or the triple layer structure, it is preferable that a front end, that is, the catalyst layer with which the mixture of the reductant and the exhaust gas first comes into contact, be the silver alumina first catalyst because deNOx efficiency of reducing nitrogen oxide to nitrogen can be maximized by removing ammonia. That is, if the catalyst has the triple layer structure, the mixture of the reductant and the exhaust gas may be injected so as to sequentially pass through the first catalyst layer, the second catalyst layer, and the third catalyst layer.

In the case where the catalyst includes the first catalyst layer, the second catalyst layer, and the third catalyst layer, the volume ratio of the first catalyst, the second catalyst, and the third catalyst may be 0.75:0.25:1 to 1:0.25:1. In the case where the volume ratio of the first catalyst, the second catalyst, and the third catalyst is included in the aforementioned range, the more excellent activity may be exhibited at the temperature of 300° C. or less.

In the second catalyst of Cu-ZSM5, Cu-SSZ13, or second catalyst of Fe-ZSM5, the amount of Cu or Fe may be 2 wt. % to 4 wt. % based on the total weight of the second catalyst (i.e., the total weight of Cu-ZSM5, Cu-SSZ13, or Fe-ZSM5), and in the second catalyst of MnFe/ZSM5, the amount of Mn may be 10 wt. % to 40 wt. % based on the total weight of the second catalyst, and the amount of Fe may be 5 wt. % to 20 wt. % based on the total weight of the second catalyst. In the case where the amounts of Cu, Fe, Mn, or the like are included in the aforementioned ranges, an ammonia removing ratio may be further improved. Further, the nitrogen oxide removing ratio may depend on the used catalyst.

In the case where the catalyst has the triple layer structure, since the catalyst has the most excellent nitrogen oxide removing effect, particularly, the most excellent nitrogen oxide removing effect even at the same catalyst volume, the total volume of the catalyst can be used to be identical with the total volume of the double layer structure, and thus the excellent nitrogen oxide removing effect can be obtained without an excessive increase in volume.

Hereinafter, specific Examples of the present invention will be suggested. However, the Examples described below are set forth to specifically illustrate or explain the present invention, but are not to be construed to limit the present invention.

Preparation Examples 1 to 7

An $AgNO_3$ solution was impregnated onto γ-$Al_2O_3$ (BET=207 m$^2$/g) to reach the amounts of Ag supported onto γ-$Al_2O_3$ of 2, 4, and 6 wt. %, respectively, and the resulting material was dried in the oven at 110° C. for 12 hours and calcined at 550° C. for 5 hours to prepare the Ag/$Al_2O_3$ catalyst (Preparation Examples 1, 2, and 3).

The Fe-ZSM5, Cu-ZSM5, and Cu-SSZ13 catalysts were prepared by ion-exchanging ZSM5 (BET=360 m$^2$/g) or SSZ13 (BET=480 m$^2$/g) with 0.01M of the $Fe(NO_3)_3 \cdot 9H_2O$ or $Cu(CH_3COO)_2 \cdot H_2O$ solution to reach the amount of Fe or Cu was about 3 wt. %, and drying the resulting materials in the oven at 110° C. for 12 hours, and calcining the materials at 550° C. for 5 hours (Preparation Examples 4, 5, and 6).

The MnFe/ZSM5 catalyst was prepared by simultaneously impregnating the $Mn(NO_3)_2 \cdot 6H_2O$ and $Fe(NO_3)_3 \cdot 9H_2O$ solutions in ZSM5 to reach the amount of Mn and Fe of 30 wt. % and 10 wt. %, respectively, and calcining the resulting materials at 500° C. for 5 hours while blowing 21% of oxygen (Preparation Example 7).

Example 1

The catalyst (Ag/$Al_2O_3$, the amount of Ag was 4 wt. %) prepared in Preparation Example 2 was put into the catalyst reaction device, and before the nitrogen oxide removing ratio was measured, pretreatment was performed under the mixed gas including 2.5 volume % of $H_2O$, 6 volume % of $O_2$, and the residual amount of He, at the temperature of 550° C. for 2 hours.

After the pretreatment, 400 ppm of NO, 2.5 volume % of $H_2O$, 6 volume % of $O_2$, and the residual amount of He were injected, and 400 ppm of $NH_2(CH_2)_2OH$ was injected as the reductant. In this case, the space velocity was set to 60,000 and after the normal state was maintained at the reaction temperature of each of 150° C., 175° C., 200° C., 250° C., 300° C., 350° C., 400° C., 450° C., and 500° C. for 2 hours, the activity at each reaction temperature was measured. Further, the mixing ratio ($MEA/NO_X$) of monoethanolamine/nitrogen oxide was set to 1.

Example 2

The catalyst reaction was performed by the same procedure as Example 1, except that 400 ppm of $NH_2CH_2CH_3$ was injected as the reductant, the reaction temperature was changed to 180° C., 200° C., 220° C., 240° C., 275° C., 300° C., 350° C., 425° C., and 500° C., and the normal state was maintained at each reaction temperature for 2 hours to perform the reaction.

Comparative Example 1

The catalyst reaction was performed by the same procedure as Example 1, except that the mixture of 400 ppm of $C_2H_5OH$ and 400 ppm of $NH_3$ was injected as the reductant, the reaction temperature was changed to 150° C., 200° C., 225° C., 250° C., 300° C., 350° C., 400° C., 450° C., and 500° C., and the normal state was maintained at each reaction temperature for 2 hours to perform the reaction.

Comparative Example 2

The catalyst reaction was performed by the same procedure as Example 1, except that 400 ppm of $C_2H_5OH$ was injected as the reductant, the reaction temperature was changed to 200° C., 250° C., 275° C., 300° C., 350° C., 400° C., 450° C., and 500° C., and the normal state was maintained at each reaction temperature for 2 hours to perform the reaction.

Comparative Example 3

The catalyst reaction was performed by the same procedure as Example 1, except that 400 ppm of $NH_3$ was injected as the reductant, the reaction temperature was changed to 159° C., 200° C., 250° C., 275° C., 300° C., 350° C., 400° C., 450° C., and 500° C., and the normal state was maintained at each reaction temperature for 2 hours to perform the reaction.

After the catalyst reactions according to Examples 1 and 2 and Comparative Examples 1 to 3 were completed, the concentrations of generated byproducts such as $NH_3$, NO, $NO_2$, $N_2O$, CO, and $CO_2$ were measured by using FT-IR (Nicolet 6700). From these results, the ratio of removed nitrogen oxide to the concentration of injected nitrogen oxide, that is, the deNOx activity, that is, the NOx conversion (%) was calculated, and the results are illustrated in FIG. 1A.

As illustrated in FIG. 1A, in the case of Examples 1 and 2 where monoethanolamine or ethylamine was used as the reductant, the result where the nitrogen oxide conversion (NOx conversion) was most excellent was obtained. In the case of Comparative Example 3 where ammonia was used as the reductant, the result where the nitrogen oxide conversion was lowest was obtained, and it can be seen that the nitrogen oxide conversion is more excellent as compared to ethanol or ammonia mainly used as the reductant in the HC/SCR reaction. In the case where ammonia is injected as the reductant, the negative nitrogen oxide conversion is exhibited at the temperature of 400° C. or more, which means generation of nitrogen oxide by oxidation of ammonia.

Moreover, after the catalyst reactions according to Examples 1 and 2 and Comparative Examples 1 to 3 were completed, the amount of generated nitrogen was measured by using the gas chromatography (GC; HP 6890) in which the packed column (molecular sieve 5A) for quantitatively analyzing generated nitrogen ($N_2$) was installed. From this result, the ratio of the concentration of generated nitrogen to the concentration of the reactant including injected nitrogen was calculated, and the result of the nitrogen-containing reactant conversion to nitrogen (%) is illustrated in FIG. 1B.

Figure 1B:
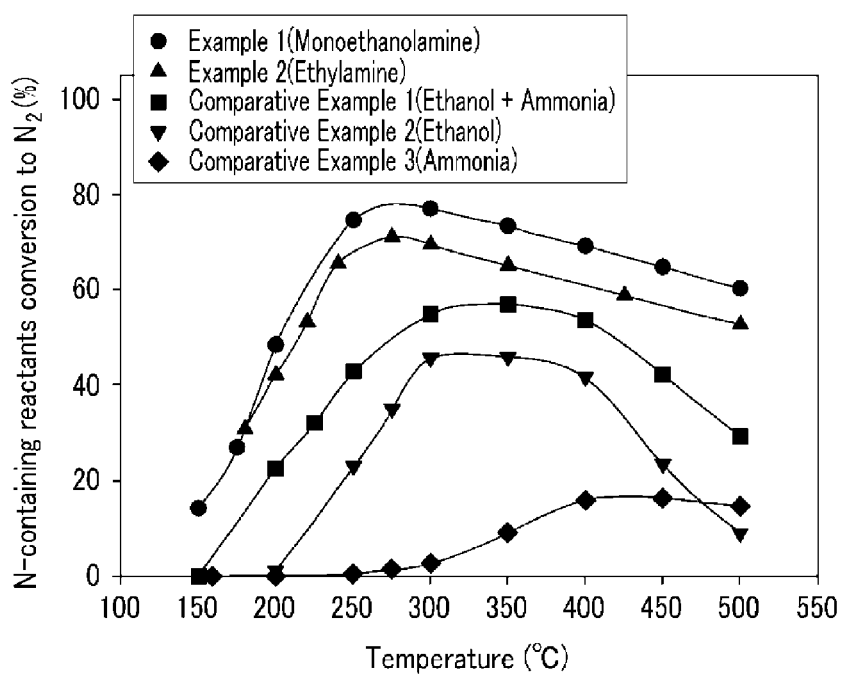
FIG. 1B is a graph illustrating an exemplary measured conversion to nitrogen ($N_2$) according to the processes of Examples 1 and 2 and Comparative Examples 1 to 3.

Further, in the result illustrated in FIG. 1B, the conversion of nitrogen oxide to nitrogen according to Examples 1 and 2 was most excellent.

Figure 1C:
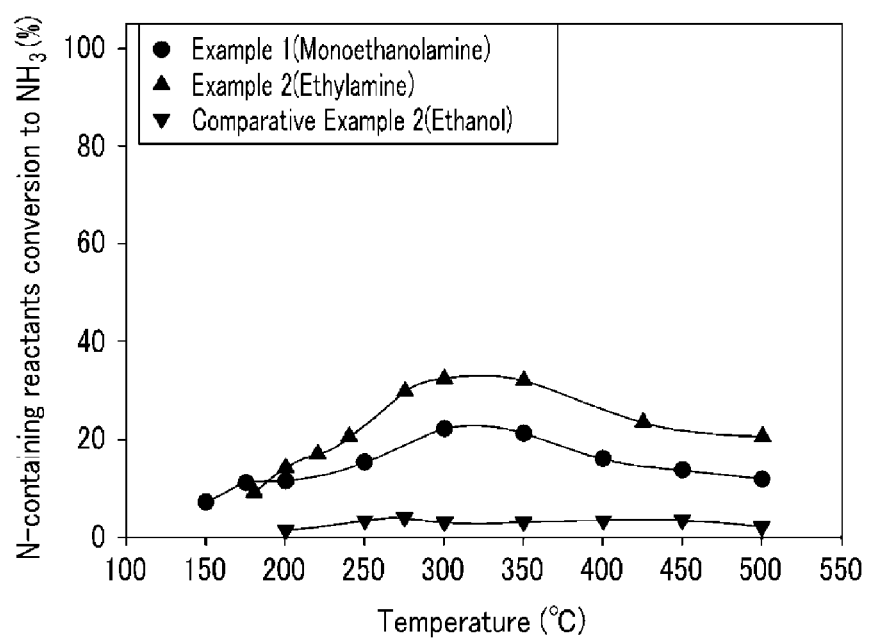
FIG. 1C is a graph illustrating an exemplary measured ammonia ($NH_3$) production according to the processes of Examples 1 and 2 and Comparative Example 2.

Further, after the catalyst reactions according to Examples 1 and 2 and Comparative Example 2, the amount of generated ammonia ($NH_3$) was measured by using the FT-IR (Nicolet 6700). From this result, the ratio of generated ammonia to the concentration of the reactant including injected nitrogen was calculated, and the result of the nitrogen-containing reactant conversion to ammonia (%) is illustrated in FIG. 1C. As illustrated in FIG. 1C, in the case of Example 2 where ethylamine was used as the reductant, since ammonia was generated in an amount that was larger than that of the case of Example 1 where monoethanol was used, it can be seen that the conversion to nitrogen is low.

Example 3

The catalyst reaction was performed by the same procedure as Example 1, except that the catalyst ($Ag/Al_2O_3$, the amount of Ag was 2 wt. %) prepared in Preparation Example 1 was used.

Example 4

The catalyst reaction was performed by the same procedure as Example 1, except that the catalyst ($Ag/Al_2O_3$, the amount of Ag was 6 wt. %) prepared in Preparation Example 3 was used.

Figure 2:
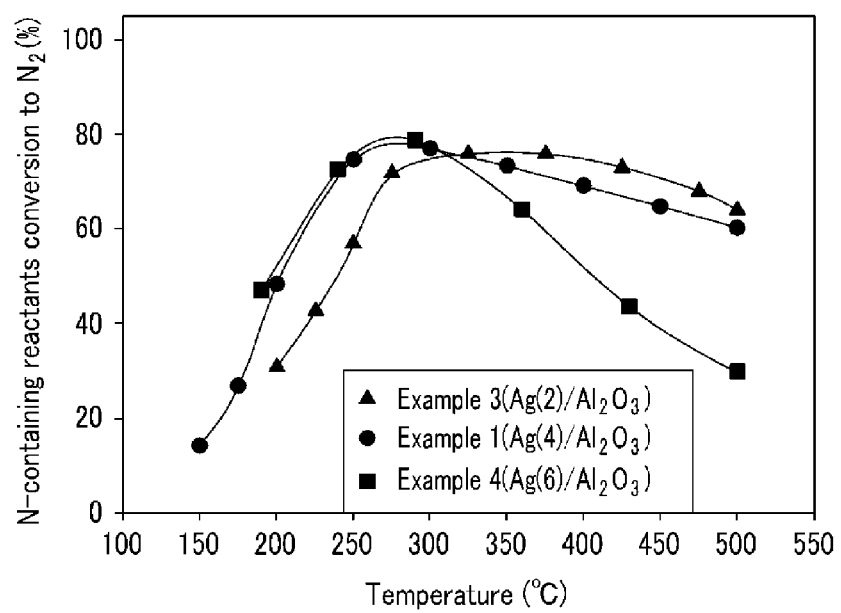
FIG. 2 is a graph illustrating an exemplary measured conversion to nitrogen ($N_2$) obtained by performing processes of Examples 1, 3, and 4.

After the catalyst reactions according to Examples 3 and 4 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 2. Further, for comparison, the result of Example 1 is illustrated together in FIG. 2. As illustrated in FIG. 2, there was obtained the result where as the amount of Ag was increased from 2 wt. % to 6 wt. %, the high temperature activity at 300° C. or higher was reduced but the low temperature activity at less than 300° C. was increased. Further, in the case of Example 1 where the amount of Ag was 4 wt. %, there was obtained the result where all the activities at low temperatures and high temperatures were excellent.

Example 5

The catalyst reaction was performed by the same procedure as Example 1, except that the mixing ratio (MEA/NOx) of monoethanolamine/nitrogen oxide was changed to 0.5.

Example 6

The catalyst reaction was performed by the same procedure as Example 1, except that the mixing ratio (MEA/NOx) of monoethanolamine/nitrogen oxide was changed to 2.

Figure 3:
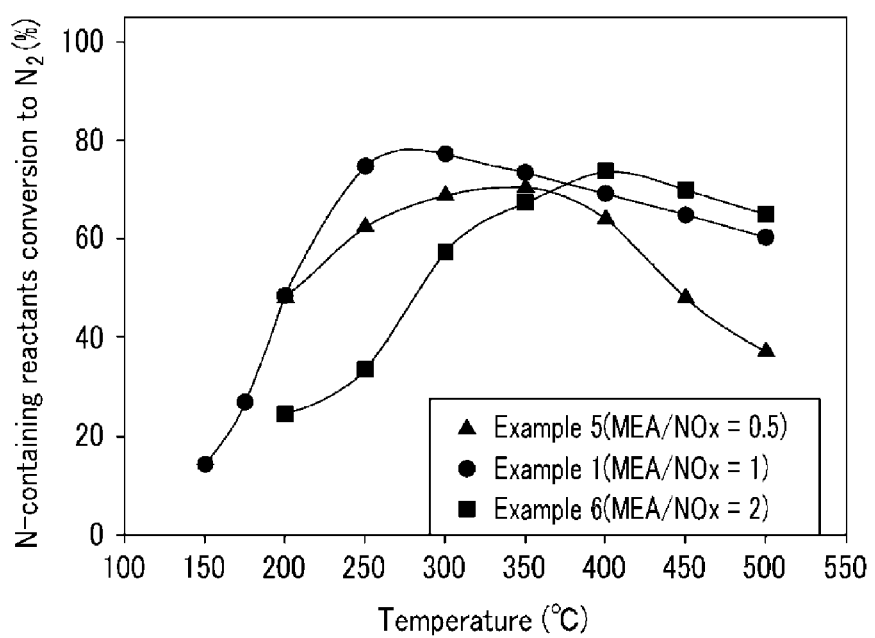
FIG. 3 is a graph illustrating an exemplary measured conversion to nitrogen ($N_2$) obtained by performing processes of Examples 1, 5, and 6.

After the catalyst reactions according to Examples 5 and 6 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 3. Further, for comparison, the result of Example 1 is illustrated together in FIG. 3.

As illustrated in FIG. 3, if the ratio of MEA (monoethanolamine)/NOx is increased from 0.5 to 1, generally, the activity was increased in the temperature range of 200° C. to 500° C. If the ratio of MEA/NOx is increased from 1 to 2, it can be seen that the nitrogen conversion was increased at the temperature of 400° C. or higher.

Example 7

The catalyst reaction was performed by the same procedure as Example 1, except that 400 ppm of NO, 0 volume % of $H_2O$, 6 volume % of $O_2$, and the residual amount of He were injected instead of 400 ppm of NO, 2.5 volume % of $H_2O$, 6 volume % of $O_2$, and the residual amount of He.

Example 8

The catalyst reaction was performed by the same procedure as Example 1, except that 400 ppm of NO, 10 volume % of $H_2O$, 6 volume % of $O_2$, and the residual amount of He were injected instead of 400 ppm of NO, 2.5 volume % of $H_2O$, 6 volume % of $O_2$, and the residual amount of He.

Figure 4:
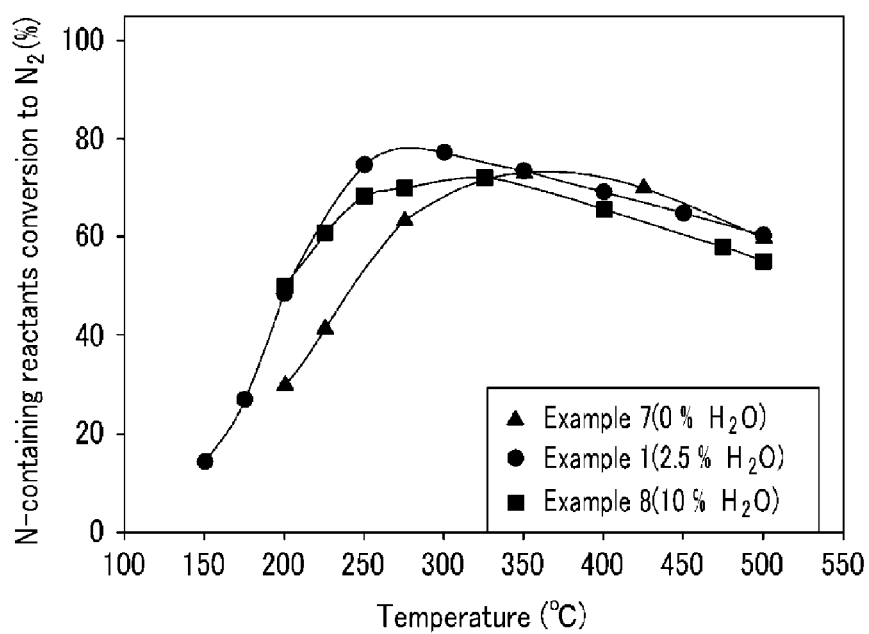
FIG. 4 is a graph illustrating an exemplary measured conversion to nitrogen ($N_2$) obtained by performing processes of Examples 1, 7, and 8.

After the catalyst reactions according to Examples 7 and 8 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 4. Further, for comparison, the result of Example 1 is illustrated together in FIG. 4. As illustrated in FIG. 4, when water was included in the experimental condition, the high activity was exhibited at 350° C. or lower as compared to the case where water was not included. Further, when the concentration of water was 2.5 volume %, the highest activity was exhibited, and when the concentration was increased to 10 volume %, the activity was apt to be slightly reduced.

Example 9

The catalyst reaction was performed by the same procedure as Example 1, except that the mixed reductant of 600 ppm of ethanol and 200 ppm of monoethanolamine was injected.

Example 10

The catalyst reaction was performed by the same procedure as Example 1, except that the mixed reductant of 700 ppm of ethanol and 100 ppm of monoethanolamine was injected.

Comparative Example 4

The catalyst reaction was performed by the same procedure as Example 1, except that 800 ppm of the ethanol reductant was injected.

Figure 5:
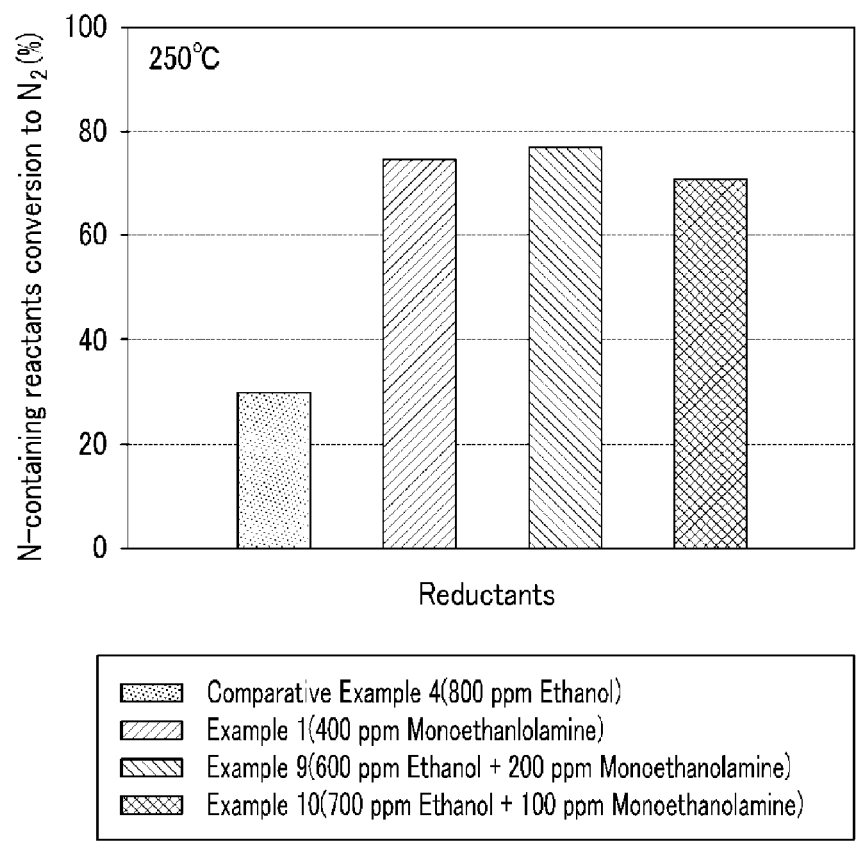
FIG. 5 is a graph illustrating an exemplary measured conversion to nitrogen ($N_2$) according to processes of Examples 1, 9, and 10 and Comparative Example 4.

After the catalyst reactions according to Examples 9 and 10 and Comparative Example 4 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 5. As illustrated in FIG. 5, when 800 ppm of ethanol was used as the reductant at 250° C., the conversion to nitrogen was 30%, but in the case where 400 ppm of monoethanolamine was used, the conversion of 75% was exhibited. Further, in the case where the concentration of monoethanolamine was reduced to 200 ppm and 600 ppm of ethanol was added, the conversion of 77% was exhibited, and in the case where the concentration of monoethanolamine was reduced to 100 ppm and 700 ppm of ethanol was added, the conversion of 71% was exhibited. That is, it can be seen that if ethanol is further added, the small amount of monoethanolamine used as the reductant, can accomplish the conversion to nitrogen of 70% or more.

Example 11

The same procedure as Example 1 was performed, except that the catalyst (the volume ratio of the first catalyst layer: the second catalyst layer=1:1) including the first catalyst layer of the catalyst ($Ag/Al_2O_3$, the amount of Ag was 4 wt %) prepared in Preparation Example 2 and the second catalyst layer of the catalyst (Fe-ZSM5) prepared in Preparation Example 4 was used. In this case, the first catalyst layer was used as the front end catalyst, and volumes of the front end catalyst and the rear end catalyst were set to be the same as each other. In this case, the space velocity of the reactor was set to 30,000 $h^{-1}$.

Example 12

The same procedure as Example 1 was performed, except that the catalyst including the first catalyst layer of the catalyst ($Ag/Al_2O_3$, the amount of Ag was 4 wt. %) prepared in Preparation Example 2 and the second catalyst layer of the catalyst (Cu-ZSM5) prepared in Preparation Example 5 was used.

Example 13

The same procedure as Example 1 was performed, except that the catalyst including the first catalyst layer of the catalyst ($Ag/Al_2O_3$, the amount of Ag was 4 wt. %) prepared in Preparation Example 2 and the second catalyst layer of the catalyst (MnFe/ZSM5) prepared in Preparation Example 7 was used.

Example 14

The same procedure as Example 1 was performed, except that the catalyst including the first catalyst layer of the catalyst ($Ag/Al_2O_3$, the amount of Ag was 4 wt. %) prepared in Preparation Example 2 and the second catalyst layer of the catalyst (Cu-SSZ13) prepared in Preparation Example 6 was used.

Figure 6:
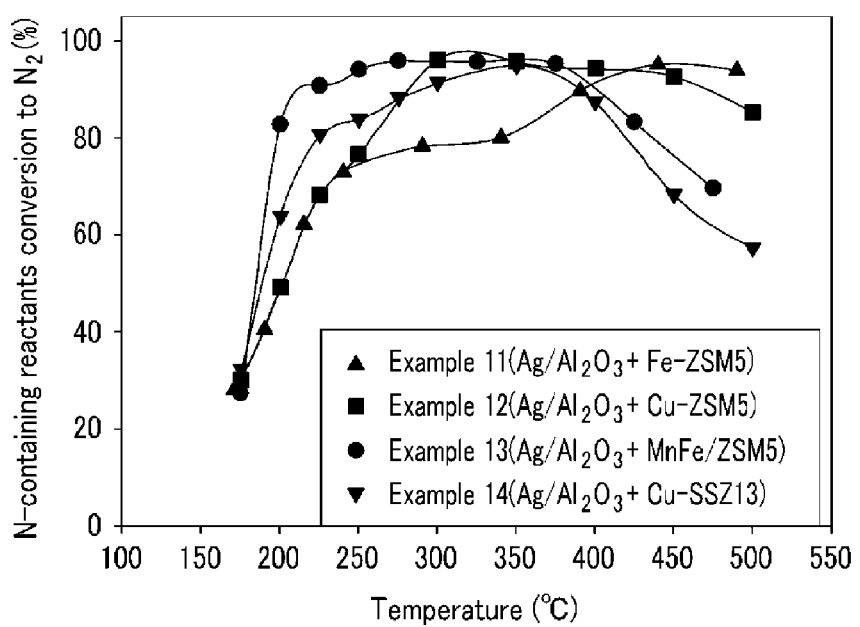
FIG. 6 is a graph illustrating an exemplary measured conversion to nitrogen ($N_2$) obtained by performing processes of Examples 11 to 14.

After the catalyst reactions according to Examples 11 to 14 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 6. In the case of Example 11, the conversion to nitrogen of 90% or more was exhibited at 400° C. or higher, and in the case of Example 12, the nitrogen conversion of 90% or more was exhibited at 300° C. or higher.

Moreover, in the case of Example 14, the nitrogen conversion was high at 275° C. or less, and in the case of Example 13, the most excellent activity was exhibited at the temperature of 375° C. or less. From this result, it can be seen that the nitrogen conversion according to the reaction temperature may be optimized by adjusting constitution of the catalyst.

Example 15

The catalyst reaction was performed by the same procedure as Example 1, except that the catalyst sequentially including the first catalyst layer of the catalyst ($Ag/Al_2O_3$, the amount of Ag was 4 wt. %) prepared in Preparation Example 2, the second catalyst layer of the catalyst (Fe-ZSM5) prepared in Preparation Example 4, and the third catalyst layer of the catalyst (MnFe/ZSM5) prepared in Preparation Example 7 was used. In this case, the total space velocity was set to 30,000 $h^{-1}$. Further, the volume ratio of the first catalyst layer, the second catalyst layer, and the third catalyst layer was set to 0.75:0.25:1.

Example 16

The catalyst reaction was performed by the same procedure as Example 15, except that the volume ratio of the first catalyst layer, the second catalyst layer, and the third catalyst layer was changed to 1:0.25:1.

Reference Example 1

The catalyst reaction was performed by the same procedure as Example 15, except that the volume ratio of the first catalyst layer, the second catalyst layer, and the third catalyst layer was changed to 1:0.25:0.75.

Figure 7:
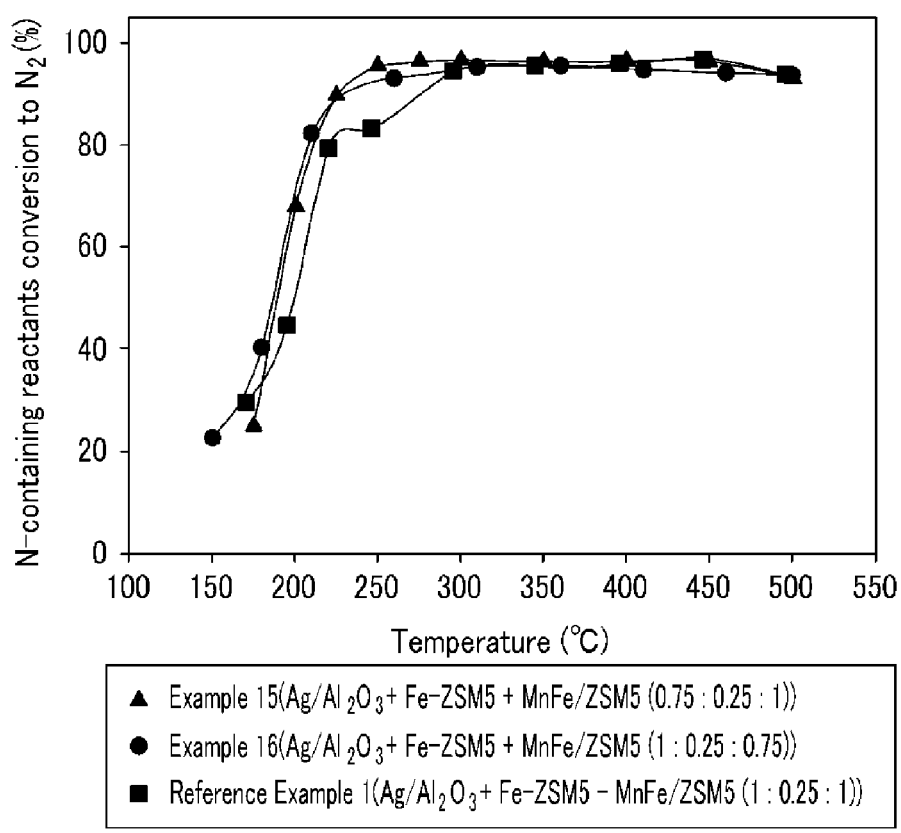
FIG. 7 is a graph illustrating an exemplary measured conversion to nitrogen ($N_2$) obtained by performing processes of Examples 15 and 16 and Reference Example 1.

After the catalyst reactions according to Examples 15 and 16 and Reference Example 1 were completed, the amount of generated nitrogen ($N_2$) was measured by using the gas chromatography (GC; HP 6890) in which the packed column (molecular sieve 5A) was installed. From this result, the conversion of the reactant including injected nitrogen to nitrogen was calculated, and the result is illustrated in FIG. 7.

In all cases of Examples 15 and 16 where the volume ratio of the catalysts was 0.75:0.25:1 and 1:0.25:1, the excellent nitrogen conversion of 80% or more was exhibited at the temperature of 200° C. or higher. In the case of Reference Example 1 where the volume ratio of the catalysts was 1:0.25:0.75, there was obtained the result where the conversion to nitrogen was reduced at the temperature of 250° C. or lower. That is, it may be seen that if the volume of the MnFe/ZSM5 catalyst is reduced, removing efficiency of generated ammonia at low temperatures deteriorates, and as a result, the conversion of nitrogen oxide to nitrogen deteriorates.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of reducing nitrogen oxide, comprising:
    injecting a reductant including an amine compound and an exhaust gas including nitrogen oxide into a catalyst system including a silver alumina ($Ag/Al_2O_3$) catalyst.

2. The method of reducing nitrogen oxide of claim 1, wherein:
    the amine compound is selected from the group consisting of monoethanolamine, ethylamine, and a combination thereof.

3. The method of reducing nitrogen oxide of claim 1, wherein:
    a reductant/nitrogen-oxide mixing ratio of the reductant and nitrogen oxide is 0.5 to 2 in the range of 150° C. to 500° C.

4. The method of reducing nitrogen oxide of claim 1, wherein:
    an amount of silver in the silver alumina catalyst is 2 wt. % to 6 wt. % based on a total weight of the catalyst.

5. The method of reducing nitrogen oxide of claim 1, wherein:
    the catalyst has a multi-layered structure including a first catalyst layer and a second catalyst layer;
    the first catalyst layer includes a first catalyst of silver alumina ($Ag/Al_2O_3$); and
    the second catalyst layer includes a second catalyst selected from the group consisting of Fe-ZSM5, Cu-ZSM5, MnFe/ZSM5, Cu-SSZ13, and a combination thereof.

6. The method of reducing nitrogen oxide of claim 1, wherein:
    the catalyst has a multi-layered structure including a first catalyst layer, a third catalyst layer, and a second catalyst layer positioned between the first catalyst layer and the third catalyst layer;
    the first catalyst layer includes a first catalyst of silver alumina ($Ag/Al_2O_3$);
    the second catalyst layer includes a second catalyst of Fe-ZSM5; and
    the third catalyst layer includes a third catalyst of MnFe/ZSM5.

7. The method of reducing nitrogen oxide of claim 6, wherein:
    a volume ratio of the first catalyst, the second catalyst, and the third catalyst is 0.75:0.25:1 to 1:0.25:1.

8. The method of reducing nitrogen oxide of claim 5, wherein:
    in the second catalyst of Cu-ZSM5, Cu-SSZ13, or Fe-ZSM5, the amount of Cu or Fe is 2 wt. % to 4 wt. % based on a total weight of the second catalyst; and
    in the second catalyst of MnFe/ZSM5, the amount of Mn is 10 wt. % to 40 wt. % based on the total weight of the second catalyst, and the amount of Fe is 5 wt. % to 20 wt. % based on the total weight of the second catalyst.

9. The method of reducing nitrogen oxide of claim 1, wherein:
    the reductant further includes ethanol, and the amount of ethanol is 13 volume % to 26 volume % based on 100 volume % of the entire reductant.

10. The method of reducing nitrogen oxide of claim 1, wherein:

the exhaust gas includes 2.5 volume % to 10 volume % of water.

11. The method of reducing nitrogen oxide of claim 1, wherein:

the catalyst has a multi-layered structure including a first catalyst layer, a third catalyst layer, and a second catalyst layer positioned between the first catalyst layer and the third catalyst layer;

the first catalyst layer includes a first catalyst of silver alumina ($Ag/Al_2O_3$);

the second catalyst layer includes a second catalyst of Fe-ZSM5;

the third catalyst layer includes a third catalyst of MnFe/ZSM5; and the reductant is injected to sequentially pass through the first catalyst layer, the second catalyst layer, and the third catalyst layer.

12. The method of reducing nitrogen oxide of claim 1, wherein the reductant is an aqueous solution of monoethanolamine having a concentration of 40 volume % to 60 volume %.

* * * * *